United States Patent [19]

Rizzie et al.

[11] Patent Number: 5,720,165
[45] Date of Patent: Feb. 24, 1998

[54] SYSTEM FOR BURNING BIOMASS TO PRODUCE HOT GAS

[75] Inventors: Joseph W. Rizzie, Knox County; Franck Picker, Anderson County, both of Tenn.

[73] Assignee: Bioten GP, Knoxville, Tenn.

[21] Appl. No.: 532,026

[22] Filed: Sep. 21, 1995

[51] Int. Cl.⁶ ............................................ F02C 3/26
[52] U.S. Cl. .................. 60/39.464; 60/39.26; 60/748; 60/39.5; 110/265; 110/300
[58] Field of Search ................ 60/39.5, 39.22, 60/39.464, 39.27, 782, 748, 39.26; 110/265, 300, 301, 348

[56] References Cited

U.S. PATENT DOCUMENTS

| | | | |
|---|---|---|---|
| 2,171,535 | 9/1939 | Berg et al. | 60/39.464 |
| 2,735,266 | 2/1956 | Atherton | 60/39.12 |
| 3,490,230 | 1/1970 | Pillsbury et al. | 60/748 |
| 4,409,786 | 10/1983 | Hamrick et al. | 60/39.464 |
| 4,539,918 | 9/1985 | Beer et al. | 60/39.464 |
| 4,546,709 | 10/1985 | Astrom | 60/39.464 |
| 4,920,898 | 5/1990 | Solbes et al. | 110/265 |
| 5,341,637 | 8/1994 | Hamrick | 60/39.464 |
| 5,557,920 | 9/1996 | Kain | 60/39.23 |

FOREIGN PATENT DOCUMENTS

| | | | |
|---|---|---|---|
| 19505 | 12/1982 | Japan | 110/265 |
| 23078 | 9/1907 | Sweden | 60/39.464 |
| 595947 | 12/1947 | United Kingdom | 60/39.464 |

*Primary Examiner*—Timothy Thorpe
*Assistant Examiner*—Ted Kim
*Attorney, Agent, or Firm*—Pitts & Brittian, P.C.

[57] ABSTRACT

A system for burning biomass to produce hot gas including a wood processing system, a combustor, a cyclone ash separator, a turbine, and a control system. The wood processing system serves to process, dry and prepare the biomass for injection into the combustor. The biomass is injected into the bottom of the combustor. Combustion of the biomass takes place in the combustor. The resultant combustion gas enters the cyclone ash separator for removal of ash in the combustion gas. The cleaned combustion gas exits the cyclone ash separator via a duct. An air bypass assembly (104) permits and controls a flow of bypass air (129) from an annulus 98 of the cyclone ash separator into the duct to combine with the combustion gas. The combustion gas and bypass air (129) enter the turbine, where they expand to power the turbine.

24 Claims, 8 Drawing Sheets

SYSTEM FOR BURNING BIOMASS TO PRODUCE HOT GAS

TECHNICAL FIELD

This invention relates to the field of power plants and more specifically to a system for producing hot gas to power a turbine, or for a fossil booster or incinerator.

BACKGROUND ART

Developing alternative sources of fuel has become an increasing concern both environmentally and economically. Traditional fossil fuels are becoming rare and expensive. Burning them often has a negative impact on the environment.

In an effort to solve the problems associated with traditional fossil fuels, attention has been directed toward burning biomass to fuel a turbine system. Biomass, in the form of sawdust, has proven to be a viable option for fueling turbine systems.

A turbine system consists generally of a combustion chamber for burning fuel in the presence of compressed air provided by an air compressor gas generator, a turbine into which high pressure combustion gas flows, expands and produces power to drive the air compressor, and an electrical generator which is powered by the power turbine.

When designing a system to burn wood, several issues must be addressed. Wood combusts at a substantially higher temperature than traditional fossil fuels. The life and effectiveness of the turbine will be substantially affected by high temperatures and ash, a byproduct of burning wood. Further, the abrasiveness of sawdust and the combustion of sawdust must be considered when feeding the sawdust into the combustion chamber.

Several systems have been developed for burning wood to produce power. Typical of the art are those devices disclosed in the following U.S. patents:

| U.S. Pat. No. | Inventor(s) | Issue Date |
| --- | --- | --- |
| 2,735,266 | G. H. Atherton | Feb. 21, 1956 |
| 4,409,786 | Hamrick et al. | Oct. 18, 1983 |
| 5,341,637 | Hamrick | Aug. 30, 1994 |

The '266 patent teaches a portable, self contained power plant for converting wood waste to electrical energy. A chamber is utilized to burn and pyrolize wood on a grate to form combustible products which are in turn injected into a second combustion chamber for complete combustion. The system generates a relatively low amount of energy due to low wood burning rates inherent with burning on a grate or pile. Further, the system does not provide a sufficient means for removing ash from the combustion gas. Also, a control system is not provided for controlling various aspects of the system during operation thereof.

The '786 and '637 patents teach wood burning systems for fueling a turbine. Each system is designed to generate a large amount of energy. The '786 patent does not teach a control system sufficient for commercial operation of the system. The systems taught in both patents teach combustors wherein the biomass is fed into the combustor from the top or proximate the top. Combustion of wood particles is inefficient with this configuration because the larger particles move out of the combustion zone, due to gravity, before they entirely combust. Further, the feeding system disclosed in both patents is not sufficient for commercial application. Moreover, with the design of the '637 combustion chamber, slag is prone to collect on the walls of the chamber. Also, the combustion chamber and cyclone filter design of the '637 patent tend to foster pressure drops. Further, the control system disclosed in the '637 patent does not provide for environmental concerns.

Therefore, it is an object of the present invention to provide a system for burning biomass to produce hot gas which includes a feeding system such that the system can be used commercially.

It is another object of the present invention to provide a system for burning biomass which includes a more efficient and smaller combustor and cyclone filter.

It is yet another object of the present invention to provide such a system which combusts the biomass more efficiently.

Moreover, it is an object of the present invention to provide a system for burning biomass to produce hot gas which includes a control system for monitoring and controlling environmentally damaging gas within the exhaust gas.

SUMMARY

Other objects and advantages will be accomplished by the present invention which provides a system for burning biomass to produce hot gas for powering a turbine. The system of the present invention includes a wood processing system, a combustor, a cyclone ash separator, a gas generator, a turbine and a control system. The wood processing system serves to process, dry and prepare the biomass for injection into the combustor. The biomass is injected into the bottom of the combustor. Combustion of the biomass takes place in the combustor. The resultant combustion gas enters the cyclone ash separator for removal of ash from the combustion gas. The combustion gas exits the cyclone ash separator via a duct. An air bypass assembly permits the injection of bypass air into the stream of the combustion gas at the exit of the cyclone. The combustion gas and bypass air enter the turbine, where they expand to power the turbine which drives an electrical generator.

BRIEF DESCRIPTION OF THE DRAWINGS

The above mentioned features of the invention will become more clearly understood from the following detailed description of the invention read together with the drawings in which.

DESCRIPTION OF THE PREFERRED EMBODIMENT

Figure 1:
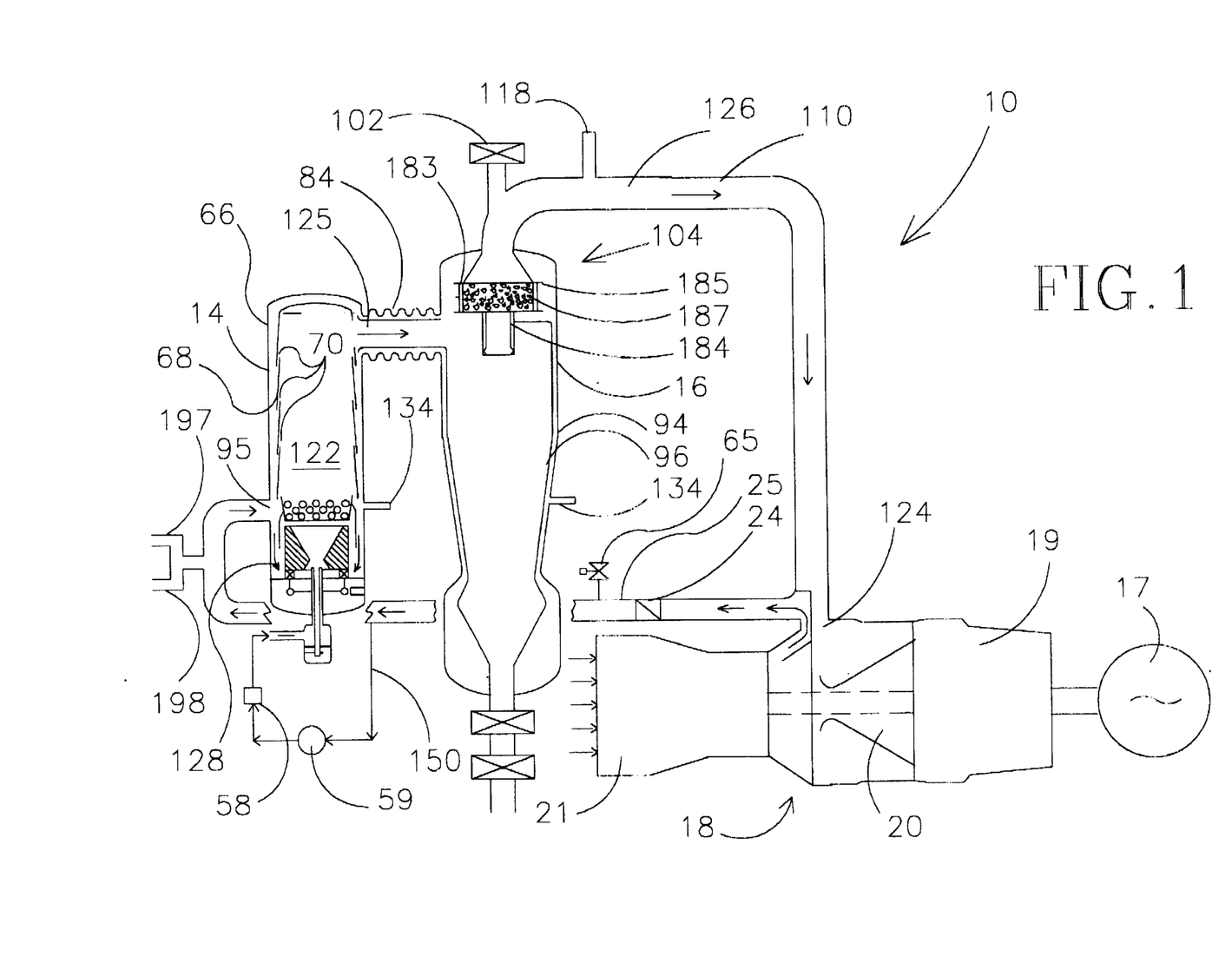
FIG. 1 illustrates the biomass burning system of the present invention.

A system for burning biomass to produce hot gas to power a turbine incorporating various features of the present invention is illustrated generally at 10 in FIG. 1. It will be noted that although a system for providing hot gas to power a turbine is described herein, it is not intended to limit the system to this particular use and can be utilized as a hot air source for a fossil power plant booster or an incinerator.

The system for burning biomass 10 is designed to provide an improved wood processing system. Further, the system provides an improved manner for injecting the biomass into the combustor 14. Moreover, an extensive control system 22, shown in FIG. 7, is provided for monitoring and controlling various aspects of the system 10, as well as exhausts and byproducts of the system 10.

Figure 7:
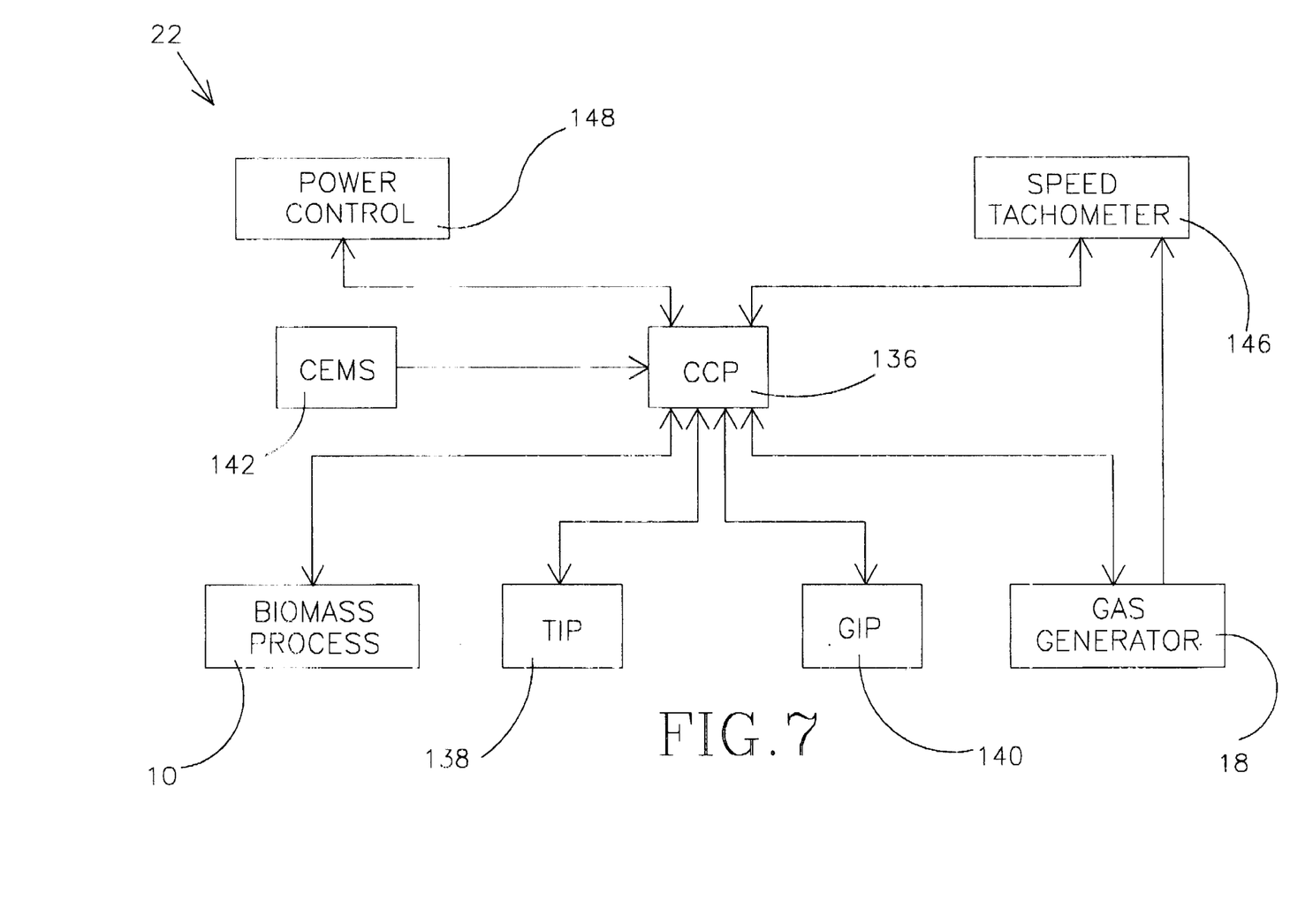
FIG. 7 is a block diagram of the control system for the system for burning biomass of the present invention; and, FIG. 8 illustrates the major CCP input and output signals and controller functions.

The system for burning biomass 10 of the present invention generally includes a wood processing system 12 (shown in FIG. 2), a combustor 14, a cyclone ash separator 16, a gas generator 18 (including both a gas generator turbine 20 and a compressor 21), a power turbine 19, an electrical generator 17 (shown in FIG. 1), and a control system 22 (shown in FIG. 7).

Figure 2:
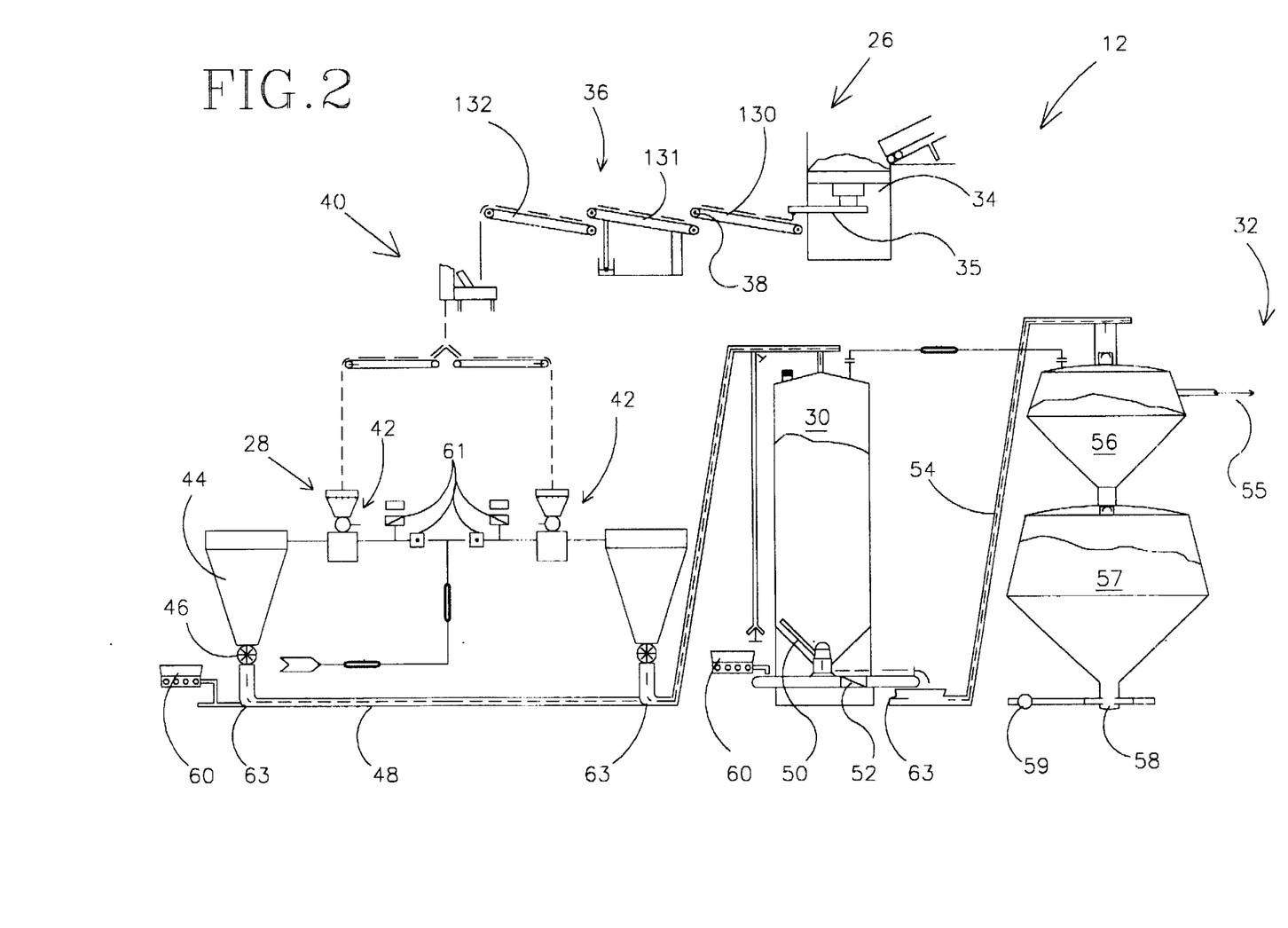
FIG. 2 illustrates the wood processing system of the present invention.

Referring to FIG. 2, the wood processing system 12 includes a reclaiming system 26, a sawdust preparation system 28, a storage unit 30 and a pressurized lock vessel assembly 32. The reclaiming system 26 includes a dump hopper 34 into which the sawdust is dumped. The sawdust is fed from the dump hopper 34, by a reclaimer 35, onto a conveyor system 36 including a first 130, second 131 and third conveyor 132. The first conveyor 130 includes a magnetic pulley 38 for removing iron and other metal from the sawdust. The second conveyor 131 is a swing conveyor used to divert biomass to yard storage piles. In the preferred embodiment, the conveyor system 36 is designed to convey a maximum of ten tons per hour. The conveyor system 36 feeds the sawdust into a destoner or aspirator 40 which removes rocks, bark, bottles and other remaining debris. From the destoner/aspirator 40, the sawdust is fed into the sawdust preparation system 28.

In the preferred embodiment, the sawdust preparation system 28 includes at least one air swept pulverizer 42 which serves to pulverize, dry and classify the sawdust in one efficient operation. The air swept pulverizer 42 can be operated in an ambient pressure mode or high pressurized mode. The ambient pressure mode has the advantage of being able to blend different types of fuels with different moisture content prior to combustion. The high pressurized mode has the advantage of processing only wet sawdust outside of the combustor thereby eliminating the potential explosion problem. Additionally, the process directs to the combustor all wood fuel ingredients including the wood alcohol vapors lost in the unpressurized system. In the wood processing system 12 depicted in FIG. 2, two air swept pulverizers 42 are utilized and they are operated in the ambient pressure mode. The sawdust enters the air swept pulverizers 42 at approximately 45 weight percent water. The sawdust is dried in the air swept pulverizers 42 to approximately 20 weight percent water. In the preferred embodiment, turbine exhaust air from the system 10 is pulled through the pulverizers 42 to dry the biomass and each air swept pulverizer 42 pulverizes and dries 9,300 pounds per hour at 350 horsepower using 13,940 (ACFM) actual cubic feet per minute of 600° F. turbine exhaust air. Drying air dampers 61 feed drying air into the pulverizers 42. Each air swept pulverizer 42 processes 9,300 pounds per hour of sawdust at 45 weight percent moisture to approximately 6,480 pounds per hour of wood fuel at 20 weight percent moisture. The preferred air swept pulverizer 42 is a Jacobson air swept pulverizer, model number 48-H.

A cyclone 44 is in communication with each of the air swept pulverizers 42, and the wood fuel from the pulverizers 42 is fed into the cyclone 44. The lower end of the cyclone 44 defines a rotary feeder 46 which passes the biomass into a drag conveyor 48.

The drag conveyor 48 moves the biomass into the top of the storage silo 30. The biomass is discharged from the bottom of the silo 30. In the preferred embodiment, the storage silo 30 is 14 feet in diameter and 24 feet in height. Sawdust entering the storage silo 30 is stored for approximately one hour before exiting from the bottom of the silo 30. The sawdust is metered out the bottom of the silo 30 via a discharging device 50. Preferably, the bottom of the silo 30 is outfitted with a Laidig Model #43245-14 45° Bin Cone Bottom Unloader. The biomass is discharged from the bottom of the silo 30 onto a belt conveyor 52. Preferably, the belt conveyor 52 includes a Reide Systems, Inc. #WE15 Belt Conveyor Scale and #1132 Totalizer. The biomass is then fed to another drag conveyor 54 which moves the biomass into the pressurized lock vessel assembly 32. In the preferred embodiment, both drag conveyors 48, 54 are 12" Enduro Flo Drag Conveyors, Type C.

The pressurized lock vessel assembly 32 includes one or two pressurized lock vessels 56 which communicate in a parallel manner to the charging vessel 57. The lock vessels 56 are pressurized for feeding the biomass into the charging vessel 57. An auger 58 at the bottom of the charging vessel 57 meters out biomass at 1–3.54 pounds per second into the pressurized combustor 14. Compressed air from the compressor 21 is input to a high temperature and pressure blower 59 which is used to boost the conveying air which discharges into the combustor 14.

The wood processing system 12 further includes two manually fillable receptacles 60. One is positioned at the front end of the first drag conveyor 48. The second receptacle 60 is positioned at the front end of the belt conveyor 52. The receptacles 60 provide a location for manually loading sawdust or additives into the system. The second receptacle 60, in particular, is a convenient location to add additives when additives are used to control the ash problem related to burning sawdust.

Figures 3, 5:
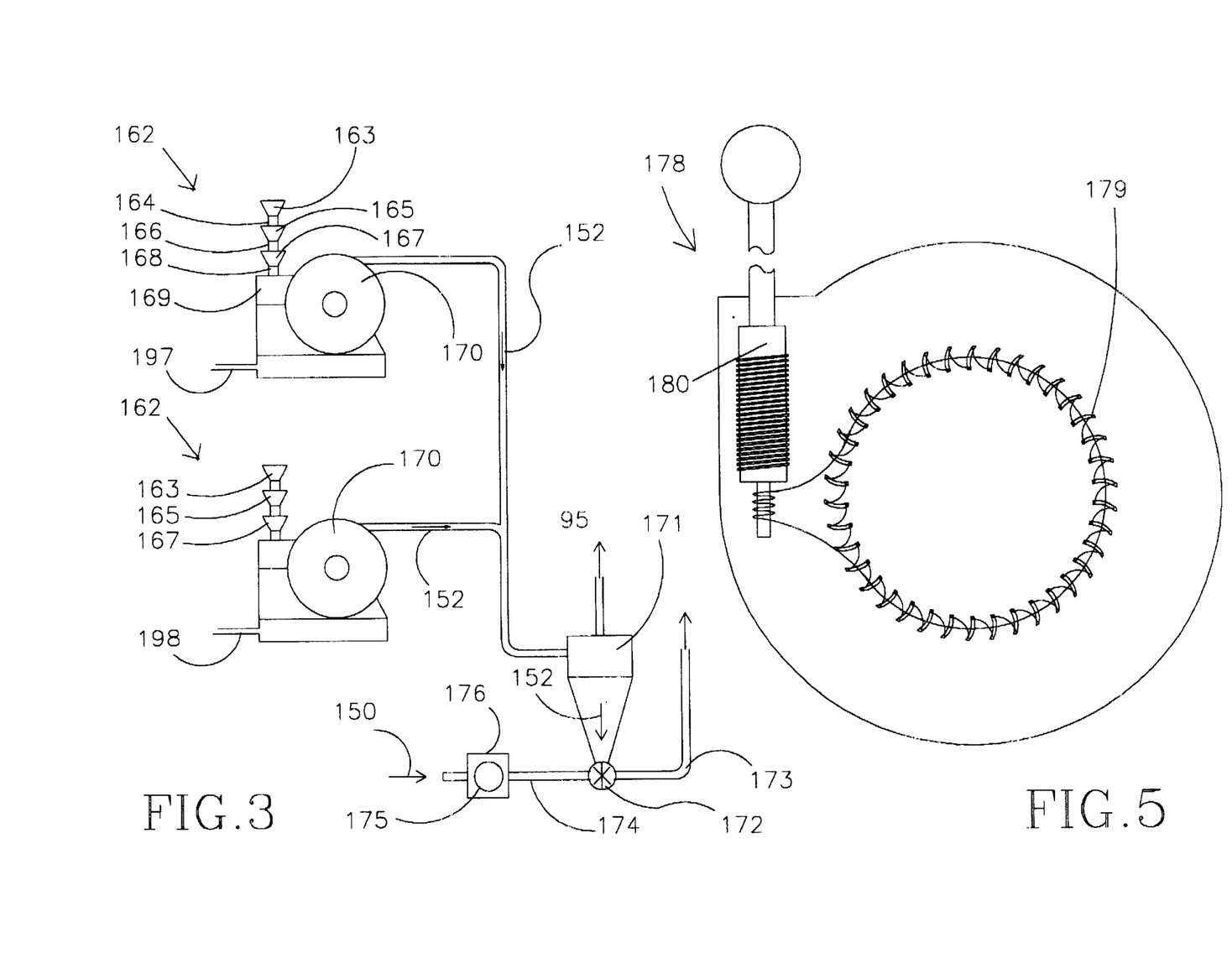
FIG. 3 illustrates an alternate embodiment of the sawdust preparation system of the present invention.
FIG. 5 is a top view of the vanes and vane actuator at the lower end of the combustor.

In an alternate embodiment, shown in FIG. 3, the sawdust preparation system 28 includes the use of a pressurized air swept pulverizer system 162. In the embodiment shown, two air swept pulverizer systems 162 are utilized in a parallel manner to feed into one high pressure and high temperature cyclone 171. It will be noted that one or more than one air swept pulverizer system 162 can be utilized. Each air swept pulverizer system 162 includes a biomass surge hopper 163, a first isolation valve 164, a lock hopper 165, a second isolation valve 166, a charge hopper 167, a metering screw 168, an air swept pulverizer feed hopper 169 and an air swept pulverizer 170. The biomass surge hopper 163 receives the processed sawdust from the destoner or aspirator 40. The sawdust moves through the first isolation valve 164 and into the lock hopper 165 where the sawdust is pressurized and raised in temperature. In the preferred embodiment, the sawdust is pressurized to 125 psia and brought to a temperature of 150° F. The sawdust moves through the second isolation valve 166 into the charge hopper 167. In the preferred embodiment, the sawdust is maintained at the same pressure and brought up to 200° F. The metering screw 168 meters the sawdust into the air swept pulverizer feed hopper 169 which feeds the sawdust into the air swept pulverizer 170 at a rate of 5 tons/hour at 45 weight percent water. The sawdust is dried and pulverized in the air swept pulverizer 170. Preferably, the sawdust is dried with hot air from the compressor 21. In the preferred embodiment, ducts 197, 198 are in communication with the combustor duct 25 to feed air into the pulverizers 170.

From the air swept pulverizer system(s) 162, the wood fuel is fed into a high pressure, high temperature cyclone 171, where the wood fuel 152 is separated from the gas. Preferably, the cyclone 171 is held at 350° F. and 125.5 psia. The high temperature air is exhausted through the top of the cyclone 171 and is injected into the combustor 14 via the port 95 to increase power and BTU input. The wood fuel 152 exits through the lower end of the cyclone 171 through a high temperature rotary air lock 172 and enters a pneumatic feed line 173. Primary air 150 from a conveying air line 174 is fed into the rotary air lock 172 to mix with the wood fuel 152. In the preferred embodiment, the rotary air lock 172 is held at 605° F. and a pressure differential of 0.5 psia and the conveying air line 174 is at 126.5 psia and delivers air into the rotary air lock 172 at a temperature of 605° F. and a rate of 2–4 pounds/sec. The wood fuel 152 and primary air 150 are fed into the bottom of the combustor 14 via the pneumatic air line 173. In the preferred embodiment, the air 150 and wood fuel 152 mixture is delivered at a temperature of 500° F. and a pressure of 126 psia; the air 150 is delivered at a rate of 8 pounds/second and the wood fuel 152 at a rate of 1–5 pounds/second at 20 weight percent water.

In the preferred embodiment, the primary air 150 is fed from the air compressor which delivers the air at 600° F. and a pressure of 125 psia. A booster fan 175 mounted in a pressure vessel 176 is utilized to boost the pressure and temperature of the primary air 150 before it enters the conveying air line 174.

It is advantageous to use the pressurized air swept pulverizer system because there is no dry fuel handling. This decreases the potential fire problem, and all volatile organic compounds are burned. Further, this system offers better fuel efficiency and emissions control and added power. Moreover, less capital equipment is required to process the sawdust.

Figure 4:
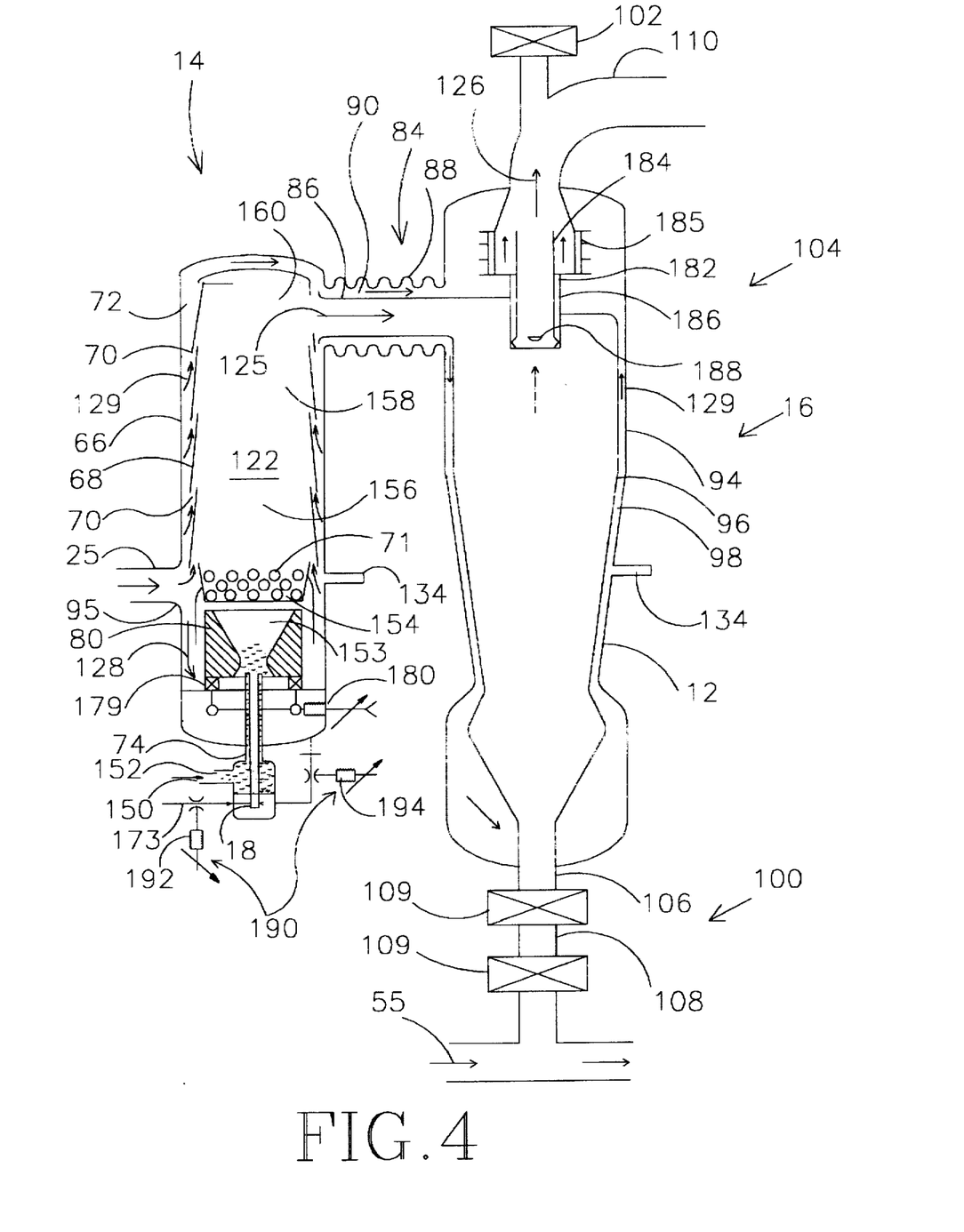
FIG. 4 illustrates an enlarged view of the combustor and cyclone.

The combustor 14, shown clearly in FIG. 4, is a pressure balanced bottom fuel feed combustor. The combustor 14 includes an outer shell 66, a combustor lining 68 defining a network of openings 71 and annular slots 70, an annulus 72 between the outer shell 66 and the combustor lining 68, a bottom fuel injector 74, a gas burner 78, and a commercial gas burner controller 190. The outer shell 66 defines a port 95 at a lower end thereof. During operation of the system 10, the port 95 receives secondary and tertiary air 128, 129 from the air compressor 21, which is powered by the gas generator turbine 20. A check valve 24 (FIG. 1) is included in the air vent 25 to the combustor 14 at port 95 to prevent back flow from the combustor 14 such that damage to the compressor 21 is prevented. Also, a pressure relief valve 65 is in communication with the duct 25 for relieving pressure in the system. Further, an alternate embodiment includes a steam injector 134 to inject steam into the tertiary air 129 of the annulus 72 of the combustor 14 and/or the annulus 98 of the cyclone 16. Steam is injected to boost turbine power after reaching 90% of achievable power by using wood fuel only. In the preferred embodiment, the outer shell 66 is fabricated from 0.500" thick carbon steel or the equivalent and the inside of the outer shell 66 is insulated with 3" thick fiberfrax insulation retained by a 0.078" SST 321 or ST 347 floating liner.

The bottom fuel injector 74 injects the wood fuel 152 from the wood processing system 12 into the bottom of the combustor 14. The fuel is metered into the pneumatic line entering the fuel injector 74 by the metering screw 58. Bottom injection of fuel into the combustor 14 increases residence time of the fuel in the combustor 14 and reduces the required energy for injection. Bottom injection also prevents accumulation of unburns, ashes and slag inside the combustor 14. In the preferred embodiment, the combustion zone at the orifice of the fuel injector 74 is lined with a refractory casting of Andalucast LCV (FSS-1151) cured to 650° F.

The lower end of the combustor 14 is configured to promote thorough burning of the wood fuel 152 fed into the combustor 14. Generally, the lower end of the combustor 14 includes a refractory cone 80 and a secondary air flow controller 178, shown in FIG. 5, for controlling the air 128 flowing from the combustor annulus 72 into the refractory cone section 153. The refractory cone 80 serves to accumulate and radiate heat to stabilize initial combustion. In the preferred embodiment, the control of the secondary air flow 128 is accomplished by a plurality of movable vanes 179 which are controlled by a vane actuator 180, shown generally in FIG. 4. A top view of the vanes 179 is shown in FIG. 5. The vanes 179 encircle the exit of the fuel injector 74. Each of the vanes 179 pivots relative to one end such that the vanes 179 can be maneuvered to control air flow therethrough. As shown in FIG. 5, the vanes are positioned in a fully open position thereby permitting a maximum air flow. Controlling the amount of secondary air 128 flowing into the lower end of the combustor 14 controls both the secondary air 128 to wood fuel 152 ratio and the flame temperature in the refractory section 153 of the combustor and promotes swirling of the wood fuel 152 for a more thorough combustion of the wood fuel 152.

The combustor liner 68 defines a plurality of spaced annular slots 70, as shown in FIG. 4. The annular slots 70 permit tertiary air 129 flowing in the annulus 72 to enter into the combustion zone 122 for supporting combustion throughout the combustor 14 and controlling the flame and gas temperature. In the preferred embodiment, the combustor liner 68 is manufactured from 0.125" thick INCONEL 625. Tertiary air 129 circulates within the annulus 72 to cool the combustor liner 68. Preferably, the combustor liner 68 is cooled to below the ash slagging temperature such that the ash will not slag on the combustor liner wall.

The combustor 14 has a single curve between the ignition point and the cyclone ash separator 16 thereby reducing the combustor pressure drop and slag collection points. A communication pipe 84 joins the combustor 14 and the cyclone ash separator 16 to physically integrate them in a pressure boundary for the combustion of fuel, control of emissions and thermal efficiency. Preferably, the communication pipe 84 is an expansion joint. The communication pipe 84 defines an annulus 90 between an inner wall 86 and an outer wall 88.

The cyclone ash separator 16 includes an outer shell 94, a cyclone liner 96, an annulus 98 between the outer shell 94 and the cyclone liner 96 and an ash collector 100. A thermal relief valve 102 and an air bypass assembly 104 are defined proximate the exit of the cyclone ash separator 16. In the preferred embodiment, the outer shell 94 of the cyclone 16 is fabricated from carbon steel or the equivalent. The annulus 98 of the cyclone 16 is in communication with the annulus 90 of the communication pipe 84 which is in communication with the annulus 72 of the combustor 14. Tertiary air 129 is circulated in the annulus 98 between the outer shell 94 and the cyclone liner 96 from the combustor annulus 72. The tertiary air 129 flows around the cyclone liner 96 to cool the cyclone liner 96 and keep the liner 96 below slagging temperature. Further, the circulating air serves to cool the outside shell 94 of the cyclone 16 to reduce thermal losses.

The ash collector 100 is located at the lower end of the cyclone liner 96 and defines two ash lock hoppers 106, 108 for receiving and holding the ash collected. Each ash lock hopper 106, 108 defines a discharging valve 109 for discharging the ash collected in that hopper 106, 108. Air 55 from the pressurized lock vessel 56 is used to convey the ash to a truck or an ash quench tank.

Referring to FIG. 1, the thermal relief valve 102 is in communication with a duct 110 leading from the cyclone ash separator 16 to the turbine inlet 124. The thermal relief valve 102 permits the discharge of hot air, before the turbine 18. More specifically, the thermal relief valve 102 allows for rapid cooling of the turbine 18 for water wash cleaning and rapid cooling of the combustor 14 during emergency shutdowns. Preferably, the thermal relief valve 102 is manufactured from INCONEL 625 or an equivalent material.

The air bypass assembly 104 permits and controls the flow of bypass air 129 (air flowing in the annulus 98 of the cyclone 16) combining with the cleaned combustion gas 126 as the gas 126 exits the cyclone 16 through the duct 110. In the embodiment shown in FIG. 4, the air bypass assembly 104 includes a fixed sleeve 182, a control sleeve 185 and an outlet pipe 184. The fixed sleeve 182 is defined by the first end of the duct 110 exiting the cyclone 16. The fixed sleeve 182 encircles the outlet pipe 184 in a manner such that an annular space 186 is defined therebetween. The annular space 186 is unobstructed at the upper end thereof. The fixed sleeve 182 supports the lower end of the outlet pipe 184 such that it is retained within the fixed sleeve 182. Further, the fixed sleeve 182 defines a plurality of openings 183 at an upper portion thereof, as shown in FIG. 1. The control sleeve 185 is annularly received by an outer surface of the fixed sleeve 182 proximate the plurality of openings 183 and defines a plurality of openings 187 which correspond to the openings 183 defined by the fixed sleeve 182, as shown in FIG. 1. The control sleeve 185 rotates to control the flow of air 129 flowing from the annulus 98 of the cyclone 16 through the upper portion of the annular space 186 defined between the fixed sleeve 182 and the outlet pipe 184. This air 129 combines with the combustion gas 126 exiting the upper end of the outlet pipe 184. In the preferred embodiment, the control sleeve 185 rotates in a limited manner, in one direction to fully block the openings 183 of the fixed sleeve 182 and in the opposing direction to reveal partially or fully the openings 183 of the fixed sleeve 182 thereby controlling the flow rate of the tertiary air or bypass air 129. The lower end of outlet pipe 184 defines a plurality of vents 188. Air flowing in the lower portion of the annular space 186 serves to cool the outlet pipe 184 and exits through the vents 188 into the entrance of the outlet pipe 184 to combine with the cleaned combustion gas 126.

Figure 6:
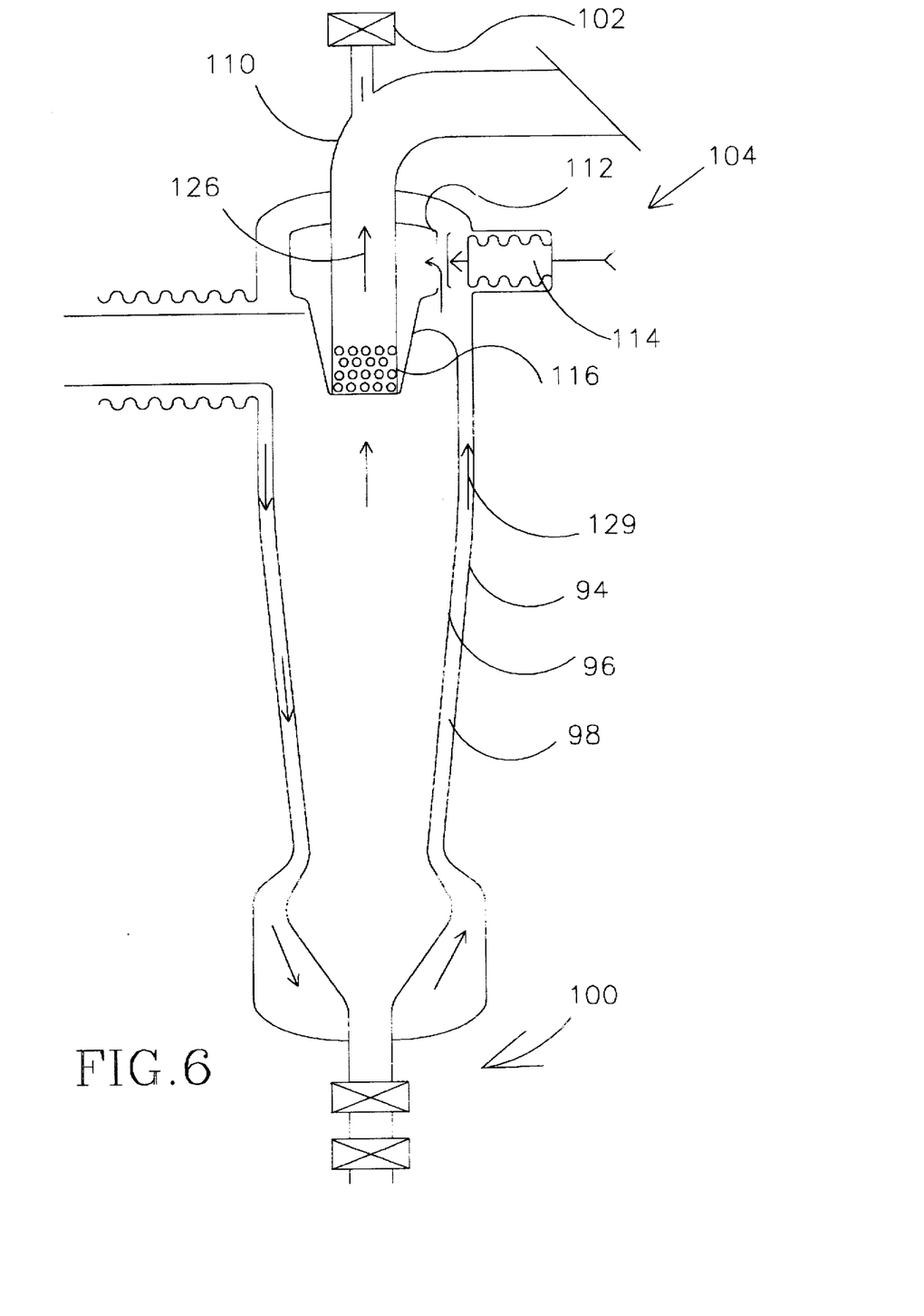
FIG. 6 is an alternate embodiment of the air bypass assembly.

In an alternate embodiment shown in FIG. 6, the air bypass assembly 104 includes a casing 112 sealed around the first end of the duct 110 and a pressure controlled bypass flow valve 114. The first end of the duct 110 defines a plurality of openings 116 open to the casing 112. When the valve 114 is opened, air from the cyclone annulus 98 flows into the casing 112, through the plurality of openings 116 and into the duct 110 and combines with the cleaned combustion gas 126. In the preferred embodiment, the bypass flow valve 114 is manufactured from SST 309 or an equivalent material.

The flame temperature and cyclone exit air temperature are monitored and controlled with excess air by modulating the bypass flow. The bypassed air 129 is directed into the cyclone exit vortex to decrease cyclone pressure loss and to increase cyclone efficiency during operation of the system.

In an alternate embodiment, a steam injector 118 is in communication with the duct 110 to inject steam into the stream of cleaned combustion gas 126 and bypassed air for added power. In an alternate embodiment, steam injectors 134 are utilized to inject steam into the secondary air 128 at the lower end of the combustor 14 and the lower end of the cyclone 16.

To begin operation of the system 10, the gas generator 18 is rotated at low speed with a starter gas engine or DC electric motor (not shown) to create a gentle draft and purge the system 10. Natural gas or oil is injected into the bottom of the combustor 14, through the starter fuel inlet or gas burner 78, and ignited by high temperature sparks to warm the combustor 14 and cyclone 16 and preheat the refractory cone 80. During initial start up and idle the gas burner 78 is utilized and is controlled via the commercial gas burner controller 190 which includes a gas pressure control 192 and an air flow control 194. The gas generator 18 is accelerated by the starter engine and sawdust fuel 152 injection is started. After the sawdust fuel 152 is ignited and the speed of the gas generator turbine 20 is increased by a combination of energy input from the starter engine and the progressively increased combustion rate, the natural gas fuel/oil is turned off. When the gas generator 18 reaches a self-sustaining energy balance speed, the starter engine is turned off. Preferably, the sawdust fuel feed rate is 3.5 lb/sec with 2–4 lb/sec primary air.

Secondary and tertiary air 128, 129 are supplied from the compressor 21 and function to support combustion and control flame and gas temperature. The air 128, 129 enters the combustor via the port 95 at the bottom of the combustor 14. In one embodiment, the air enters the port 95 at a rate of 121.5 lb/sec, a temperature of 600° F. and a pressure of 125 psi with a density of 0.318 ft$^3$/sec. The secondary air 128 flows through the vanes 179 at the lower end of the combustor 14 and enters the refractory section 153. The secondary air 128 flowing through the vanes 179 serves two main functions, to swirl the wood fuel 152 as it feeds into the refractory section 153 and to control the flame temperature in the refractory section 153. The vanes 179 are configured such that as the air/wood fuel mixture enters the refractory section 153 it establishes a swirling action such that the wood fuel 152 is retained within the refractory section 153 for an extended period to encourage more thorough heating of the wood fuel 152, ultimately encouraging combustion of all wood fuel 152. The conditions in the refractory section 153 are below stoichiometric conditions such that complete combustion does not take place in the refractory section 153.

The tertiary air 129 enters the combustion zone 154 just above the refractory 80 through a network of holes 71 and slots 70 defined by the combustor liner 68 to immediately complete combustion. The amount of air fed into the combustion zone 122 is such that the oxygen content is above stoichiometry.

The surface temperatures inside the combustor liner 68 are about 1400° F. maximum due to cooling by the tertiary air 129 which is at approximately 640° F. Surface temperatures of the outside of the combustor liner 68 are approximately 910° F. while the insulated outer wall of the outer shell 66 is about 269° F. The resulting outside ambient air is about 100° F.

The primary air 150 for injection with the wood fuel 152 comes directly from the compressor 21. When utilizing the sawdust preparation system shown in FIG. 2, the air is fed through an air cooler and/or water injection system for cooling and is then boosted by a fan. The sawdust fuel 152 enters from the bottom of the pressurized lock vessel assembly 32 and is carried by the primary air 150 to the bottom of the combustor 14 where it is injected. When utilizing the sawdust preparation system depicted in FIG. 3, a booster fan 175, mounted in a pressure vessel 176, is utilized to boost the pressure and temperature of the primary air 150 before it is ultimately delivered to the bottom of the combustor 14.

Combustion temperatures inside the refractory section 153 at the bottom of the combustor 14 reach approximately 2200° F. and decrease along the combustor as the tertiary air 129 flows into the combustion zones through the combustor annular slots 70. The cooling of the inner wall of the combustor liner 68 by the tertiary air 129 flow prevents slag formation and residue inside the combustor liner wall. The temperature of the combustion gas cools to 1600° F. maximum as it turns into the communication pipe 84 joining the combustor 14 and the cyclone 16.

Particulates are separated from the combustion gas 125 in the cyclone ash separator 16 and are ultimately collected at the bottom in the second ash lock hopper 108. Clean combustion gas 126 exits at the top of the cyclone 16 at a maximum temperature of 1580° F., at 70 lb/sec and at 122 psi. As it exits, the clean combustion gas 126 is mixed with diverted air 129 from the air bypass assembly 104 and then is routed to the turbine 20 via the duct 110, at a pressure of approximately 122 psi and a temperature of 1350° F.

The use of the bypass air allows the combustor volume to be reduced. The lower air-gas flow rate through the combustor 14 and the cyclone 16 decreases ash carry over and allows the design of a more efficient cyclone 16. This feature reduces the ash grains per cubic foot in the turbine exhaust by 50%.

The gas generator 18 utilized in the system 10 has a split shaft to allow the gas generator turbine 20 and power turbine 19 to rotate at different revolutions per minute. In the preferred embodiment, the gas generator 18 is a modified LM1500 with a special center section and check valve to allow off-board firing without blowback.

Upon entering the gas generator turbine 20, the combustion gas 126 expands to produce work. The gas generator turbine 20 powers the air compressor 21 via a drive shaft. The power turbine 19 drives the electrical generator 17 which is linked to an electrical power transmission line. The power in excess of that required to drive the biomass burning system 10 is supplied to the outside user. Therefore, a load rejection device is not needed due to the internal use of electrical power in the biomass burning system 10 and specifically in the wood drying process.

Steam is injected to boost turbine power after reaching 90% of achievable power by using wood fuel only.

Figure 8A:
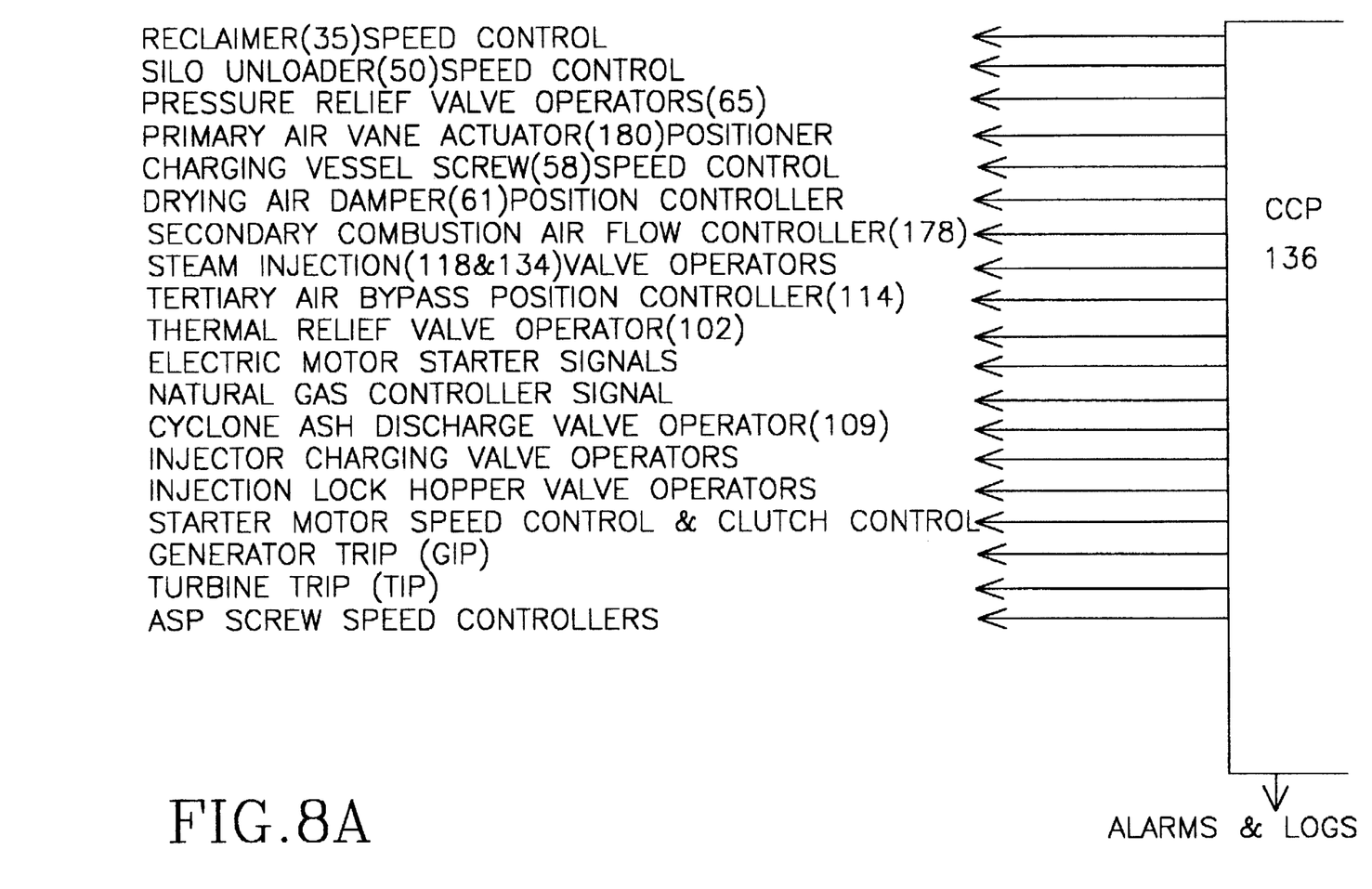
Figure 8B:
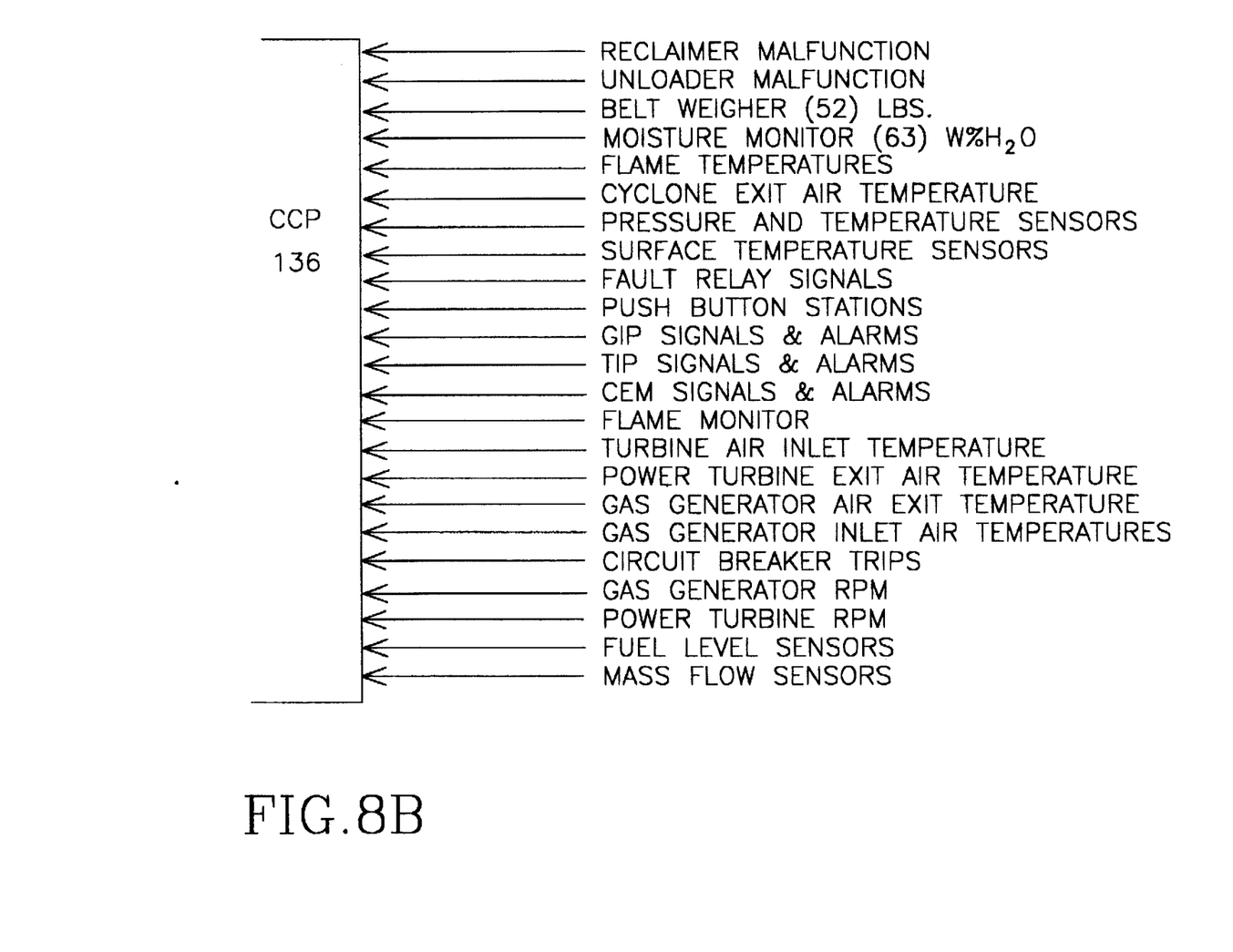

Referring to FIG. 7, the control system 22 includes a combustion control processor (CCP) 136 which is utilized to monitor and control the biomass burning system 10. The CCP 136 is a distributed process controller that regulates the combustion process and monitors the combustion gas 125 and cleaned combustion gas 126. In the preferred embodiment, the distributed process controller is a Bristol Babcock 3335 DPC. The purpose of the control system 22 is to monitor functions from the biomass burning system 10, a generator instrument package (GIP) 140, a turbine instrument package (TIP) 138 and a continuous emissions monitor (CEM) 142 and to use these inputs to provide a safe and efficient control of the biomass burning system 10 and to instruct the speed tachometer 146 and power controller 148. In the preferred embodiment, the GIP is an Allen Bradley line synchronization module, the TIP is manufactured by General Electric (model number 7LM1500 GD102), and the CEM is an EPI 410. FIG. 8 illustrates the major CCP input and output signals and controller functions.

The biomass burning process includes the wood processing and the combustion process. Selected conditions within the wood processing system 12, the combustor 14, the cyclone 16 and the gas generator 18 are monitored by the CCP 136. Within the wood processing system 12, the temperature of the hot exhaust for drying and the dryer inlet and outlet air temperatures are monitored. Moisture monitors 63 are located throughout the wood processing system 12 to monitor the moisture of the wood fuel 152 as it is processed for use.

In the combustor 14, the temperature of the combustion zone 122 is monitored, and preferably the first 154, second 156, fourth 158 and fifth zones 160 are individually monitored. Moreover, the temperature at the entrance of the first combustion zone 154 and the temperature at the exit of the first zone 154 are specifically monitored. In the preferred embodiment, the temperatures at these various locations are measured with high temperature thermocouples, type S.

The temperature of the pneumatically fed fuel 152, the temperature of the primary air 150 after the cooler and after water injection, and the temperature of the secondary air 128 before and after steam injection are monitored, preferably, with type K thermocouples.

Also, the mass flow, the fuel feed rate and pressure in the injection line 173 are monitored. Preferably, the mass flow rate is measured with a Kurz mass flow monitor. The injection line fuel feed rate is measured with a pressure transmitter. The feed rate of fuel is a function of the revolutions per minute (RPM) of the injector screw. The pressure at the exit of the combustor 14, the pressure across the pneumatic feed booster and the compressor 21 air flow into the combustor 14 are monitored, preferably, with pressure transmitters. Further, the temperature of the combustion gas 125 entering the cyclone and the cleaned combustion gas 126 exiting the cyclone are monitored.

In the gas generator 18, the temperature of the gas entering and leaving the compressor 21, the temperature of the gas entering the gas generator turbine 20, the temperature of the gas leaving the power turbine 19, the flow rate of air flowing in the gas generator air vent 25 and the pressure at the exit of the compressor 21 are also monitored with similar transducers. Further, the gas generator speed and the power turbine speed are monitored and, in the preferred embodiment, the load of the turbine 19 is also monitored such that the control system 22 can maintain the turbine 19 at a constant speed with a variable load. A more rapid response is provided when both the speed and the load are monitored.

The generator instrument package (GIP) 140 and the turbine instrument package (TIP) 138 function as industrial systems maintaining the turbine 19 and generator 18 functions and monitor certain aspects of the generator 18 and the turbine 19, respectively, such as vibration, lube oil pressure and temperature, power turbine and gas generator RPM, generator volts, amps etc. The GIP 140 and TIP 138 provide controls for shutting down the system when preestablished limits have been passed.

The continuous emissions monitor (CEM) 142 controls emissions, regulates combustion and provides environmental reporting. Specifically, the continuous emissions monitor 142 monitors the level of carbon monoxide, particulates, and $NO_x$ in the turbine exhaust gas. The CEM controls emissions by monitoring the exhaust carbon monoxide level and regulating the combustor air via the CCP. The controls are implemented to control the level of CO when it exceeds EPA standards.

The information from the biomass burning system 10, the gas generator 18, the GIP 140, the TIP 138 and the CEM 142 is utilized to instruct the speed and power controllers 146, 148 such that the biomass burning system 10 operates in a safe and efficient manner. Specifically, the CCP 136 uses a software program to control the steam injector 118 at the exit of the cyclone 16, the steam injectors 134 at the combustor 14 and the cyclone 16 when utilized, the vane actuator 180 for controlling the flow of the secondary air 128 into the combustor 14, the fuel feed injector 74, the gas burner controller 190, the air bypass assembly 104 and the thermal relief valve 102. The CCP 136 outputs a current which provides a pressure signal to the vane actuator 180. The air bypass assembly 104 is set according to the system power level. The thermal relief valve 102 is interlocked with the distributed process controller and is opened with a key switch electro pneumatic system.

The speed of the power turbine 19 is controlled in one of two manners depending upon whether the system 10 is linked to an outside system or not. When the biomass burning system 10 is connected to the outside transmission line, the speed is controlled by the 60 cycle balance of the transmission line. However, when the system 10 is connected to an internal load, the speed of the power turbine 19 and the gas generator 18 are under the control of the combustion control processor 136. A mechanical speed governor is utilized as a control loop independent of the combustion control processor 136 for controlling the speed of the gas generator 18 in the event of a control system 22 failure.

From the foregoing description, it will be recognized by those skilled in the art that a system for burning biomass to produce hot gas offering advantages over the prior art has been provided. Specifically, the system for burning biomass provides an improved manner for injecting the wood fuel 152 or biomass into the combustor 14. Further, the control system includes an air bypass assembly 104 for injecting air into the stream of the combustion gas 126 to control the combustion process. The use of the bypass assembly 104 permits the use of smaller cyclone 16, increases the efficiency of the cyclone filter and controls slagging and emissions. Also, a thermal relief valve 102 is included for rapid cooling of the gas generator turbine 20 and the combustor 14.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A system for burning biomass particles to produce hot gas comprising:

a gas generator turbine defining a plurality of blades;

a pressurized combustor including a combustion mechanism for the combustion of the biomass particles within a combustion zone thereby producing combustion gas, said pressurized combustor defining an outer shell, a combustor liner and a first annulus between said outer shell and said combustor liner, said combustor liner including at least one annular opening, said outer shell defining a port at a lower end thereof, said pressurized combustor including a refractory cone at said lower end thereof which defines an initial combustion zone, said refractory cone accumulating and radiating heat to stabilize initial combustion of the biomass particles as they enter said initial combustion zone;

a feeding device for feeding the biomass particles into the bottom of said pressurized combustor;

a cyclone ash separator for removing ash from said combustion gas, said cyclone ash separator communicating with said pressurized combustor via a communication pipe, said communication pipe defining a second annulus in communication with said first annulus, said cyclone ash separator defining a cyclone shell, a cyclone liner, a third annulus therebetween, and a duct, said third annulus being in communication with said second annulus, said duct for ducting said combustion gas into said gas generator turbine to rotate said gas generator turbine at a rotational speed;

an air compressor for circulating compressed air in said first, second and third annuluses via said port, said air compressor being driven by said gas generator turbine, said compressed air entering said combustion zone through said at least one annular opening, said compressed air facilitating said combustion mechanism; and, a control system for controlling said rotational speed of said gas generator turbine and a biomass particle feed rate into said pressurized combustor.

2. The system for burning biomass of claim 1 wherein said pressurized combustor defines a means for controlling an air flow from said first annulus through said bottom of said pressurized combustor to promote swirling of the biomass particles.

3. The system for burning biomass of claim 2 wherein said means for controlling an air flow includes a plurality of vanes and a vane actuator, said plurality of vanes encircling an exit of said feeding device within said first annulus at a lower end of said pressurized combustor, each of said plurality of vanes pivoting with respect to one end, said vane actuator for controlling said pivoting of said plurality of vanes thereby controlling a spacing between each of said plurality of vanes.

4. The system for burning biomass of claim 1 wherein said pressurized combustor defines a means for controlling an air flow from said first annulus through said bottom of said pressurized combustor to promote swirling of the biomass particles.

5. The system for burning biomass of claim 4 wherein said means for controlling an air flow includes a plurality of vanes and a vane actuator, said plurality of vanes encircling an exit of said feeding device within said first annulus at a lower end of said pressurized combustor, each of said plurality of vanes pivoting with respect to one end, said vane actuator for controlling said pivoting of said plurality of vanes thereby controlling a spacing between each of said plurality of vanes.

6. The system for burning biomass of claim 1 wherein said control system includes an air bypass assembly for permitting and controlling a flow of bypass air into said duct from said third annulus of said cyclone ash separator, said bypass air combining with said combustion gas in said duct.

7. The system for burning biomass of claim 6 wherein said air bypass assembly defines a fixed sleeve, an outlet pipe and a control sleeve, said fixed sleeve being defined by a first end of said duct, said outlet pipe being received within and supported by said fixed sleeve in a manner such that a fourth annulus is defined therebetween, an upper end of said fourth annulus being unobstructed and in communication with said duct, said control sleeve being annularly received by an outer surface of said fixed sleeve and being rotatable about said fixed sleeve, said upper end of said fixed sleeve defining a plurality of first openings, said control sleeve defining a plurality of second openings each of which corresponding to each of said plurality of first openings, said control sleeve being in communication with said third annulus of said cyclone ash separator, said control sleeve rotating around said fixed sleeve to control the amount of the plurality of first openings revealed thereby controlling the amount of said compressed air within said third annulus flowing through said first and second plurality of openings and into said fourth annulus.

8. The system for burning biomass of claim 6 wherein said air bypass assembly defines a casing and a bypass flow valve, said duct defining a plurality of openings at a first end thereof, said casing enclosing an outer surface of said first end of said duct, said bypass flow valve being in communication with said third annulus of said cyclone ash separator, said bypass flow valve permitting a flow of a portion of said compressed air in said third annulus to flow into said casing and through said plurality of openings of said duct to mix with said combustion gas entering said duct.

9. The system for burning biomass of claim 1 wherein said control system includes a thermal relief valve in communication with said duct proximate an exit of said cyclone ash separator for the release of said combustion gas.

10. The system for burning biomass of claim 1 wherein said cyclone ash separator further includes at least one ash lock hopper for receiving and retaining the ash removed from said combustion gas.

11. The system for burning biomass of claim 1 further including a wood processing system for processing and preparing the biomass for injection into said system.

12. The system for burning biomass of claim 11 wherein said wood processing system includes air swept pulverizers which pulverize, dry and classify the biomass.

13. A system for burning biomass particles to produce hot gas comprising:

a gas generator turbine defining a plurality of blades;

a pressurized combustor including a combustion mechanism for the combustion of the biomass particles within a combustion zone thereby producing combustion gas, said pressurized combustor defining an outer shell, a combustor liner and a first annulus between said outer shell and said combustor liner, said combustor liner including at least one annular opening, said outer shell defining a port at a lower end thereof;

a feeding device for feeding the biomass particles into the bottom of said pressurized combustor;

a cyclone ash separator for removing ash from said combustion gas, said cyclone ash separator communicating with said pressurized combustor via a communication pipe, said communication pipe defining a second annulus in communication with said first annulus, said cyclone ash separator defining a cyclone shell, a cyclone liner, a third annulus therebetween, and a duct, said third annulus being in communication with said second annulus, said duct for ducting said combustion gas into said gas generator turbine to rotate said gas generator turbine at a rotational speed;

an air compressor for circulating compressed air in said first, second and third annuluses via said port, said air compressor being driven by said gas generator turbine, said compressed air entering said combustion zone through said at least one annular opening, said compressed air facilitating said combustion mechanism; and, a control system for controlling said rotational speed of said gas generator turbine, said control system including an air bypass assembly for permitting and controlling a flow of bypass air into said duct from said third annulus of said cyclone ash separator, said bypass air combining with said combustion gas in said duct.

14. The system for burning biomass of claim 13 wherein said pressurized combustor includes a refractory cone at lower end thereof which defines an initial combustion zone, said refractory cone accumulating and radiating heat to stabilize initial combustion of the biomass particles as they enter said initial combustion zone.

15. The system for burning biomass of claim 16 wherein said pressurized combustor defines a means for controlling an air flow from said first annulus through said bottom of said pressurized combustor to promote swirling of the biomass particles.

16. The system for burning biomass of claim 15 wherein said means for controlling an air flow includes a plurality of vanes and a vane actuator, said plurality of vanes encircling an exit of said feeding device within said first annulus at a lower end of said pressurized combustor, each of said plurality of vanes pivoting with respect to one end, said vane actuator for controlling said pivoting of said plurality of vanes thereby controlling a spacing between each of said plurality of vanes.

17. The system for burning biomass of claim 13 wherein said pressurized combustor defines a means for controlling an air flow from said first annulus through said bottom of said pressurized combustor to promote swirling of the biomass particles.

18. The system for burning biomass of claim 17 wherein said means for controlling an air flow includes a plurality of vanes and a vane actuator, said plurality of vanes encircling an exit of said feeding device within said first annulus at a lower end of said pressurized combustor, each of said plurality of vanes pivoting with respect to one end, said vane actuator for controlling said pivoting of said plurality of vanes thereby controlling a spacing between each of said plurality of vanes.

19. The system for burning biomass of claim 13 wherein said air bypass assembly defines a fixed sleeve, an outlet pipe and a control sleeve, said fixed sleeve being defined by a first end of said duct, said outlet pipe being received within and supported by said fixed sleeve in a manner such that a fourth annulus is defined therebetween, an upper end of said fourth annulus being unobstructed and in communication with said duct, said control sleeve being annularly received by an outer surface of said fixed sleeve and being rotatable about said fixed sleeve, said upper end of said fixed sleeve defining a plurality of first openings, said control sleeve defining a plurality of second openings each of which corresponding to each of said plurality of first openings, said control sleeve being in communication with said third annulus of said cyclone ash separator, said control sleeve rotating around said fixed sleeve to control the amount of the plurality of first openings revealed thereby controlling the amount of said compressed air within said third annulus flowing through said first and second plurality of openings and into said fourth annulus.

20. The system for burning biomass of claim 13 wherein said air bypass assembly defines a casing and a bypass flow valve, said duct defining a plurality of openings at a first end thereof, said casing enclosing an outer surface of said first end of said duct, said bypass flow valve being in communication with said third annulus of said cyclone ash separator, said bypass flow valve permitting a flow of a portion of said compressed air in said third annulus to flow into said casing and through said plurality of openings of said duct to mix with said combustion gas entering said duct.

21. The system for burning biomass of claim 13 wherein said control system includes a thermal relief valve in communication with said duct proximate an exit of said cyclone ash separator for the release of said combustion gas.

22. The system for burning biomass of claim 13 wherein said cyclone ash separator further includes at least one ash lock hopper for receiving and retaining the ash removed from said combustion gas.

23. The system for burning biomass of claim 13 further including a wood processing system for processing and preparing the biomass for injection into said system.

24. The system for burning biomass of claim 23 wherein said wood processing system includes air swept pulverizers which pulverize, dry and classify the biomass.

* * * * *